(12) United States Patent
Lee et al.

(10) Patent No.: US 7,457,291 B2
(45) Date of Patent: Nov. 25, 2008

(54) METHOD AND APPARATUS FOR GENERATING PREAMBLE USING CHAOTIC SEQUENCE

(75) Inventors: Ye-hoon Lee, Suwon-si (KR); Yong-suk Kim, Deajeon (KR); Dmitriev Alexandre, Moscow (RU); Starkov Sergey, Moscow (RU)

(73) Assignee: Institute of Radio Engineering and Electronics of RAS, Moscow (RU)

( * ) Notice: Subject to any disclaimer, the term of this patent is extended or adjusted under 35 U.S.C. 154(b) by 741 days.

(21) Appl. No.: 10/870,551

(22) Filed: Jun. 18, 2004

(65) Prior Publication Data

US 2005/0036479 A1 Feb. 17, 2005

Related U.S. Application Data

(60) Provisional application No. 60/479,220, filed on Jun. 18, 2003.

(30) Foreign Application Priority Data

Oct. 15, 2003 (KR) ............ 10-2003-0071618

(51) Int. Cl.
*H04L 7/00* (2006.01)
(52) U.S. Cl. .................................... 370/392; 370/476
(58) Field of Classification Search ............. 370/392, 370/476; 375/362; 703/2; 463/22, 20; 273/139, 273/138.1; 708/250, 252; 704/207, E15.041; 380/263
See application file for complete search history.

(56) References Cited

U.S. PATENT DOCUMENTS

2001/0038674 A1 11/2001 Trans

OTHER PUBLICATIONS

Park et al, "Preamble Contribution for the IEEE 802.15.3a standard", Jul. 2003, submitted for Project: IEEE P802.15 Working Group for Wireless Personal Area Networks (WPANs).*
Maggio et al, "Pseudo-Chaotic Time Hopping For UWB Impulse Radio", IEEE Transactions on Circuits and Systems- I: Fundamental Theory and Applications, vol. 48, No. 12, Dec. 2001.*
http://www.wikipedia.org/:defining Bluetooth and Piconet.*
Dmitriev et al., High-Rate-Digital Data Transmission Using Dynamic Chaos, Soviet Journal of Communications Technology and Electronics, Scripta Technica, Silver Spring, MD, US, vol. 44, No. 3, Mar. 1999 pp. 302-306.
Dimitriev et al., "Experiments on Ultrawideband Direct Chaotic Data Transmission in the Microwave Band", Journal of Communications Technology and Electronics, vol. 47, No. 10, 2002, pp. 1112-1120.
Zakharov et al., "Detection of preamble of random access burst in W-CDMA system", Personal, Indoor and Mobile Radio Communications, 2000, PIMRC 2000, The 11th IEEE International Symposium on Sep. 18-21, 2000 Piscataway, NJ, USA, IEEE, Sep. 18, 2000 pp. 82-86.

* cited by examiner

*Primary Examiner*—Gilberto Barron, Jr.
*Assistant Examiner*—Hadi Armouche
(74) *Attorney, Agent, or Firm*—Sughrue Mion, PLLC (57) ABSTRACT

A preamble generating method which includes computing (N) chaotic samples; transforming the (N) chaotic samples into (N) binary values of certain bits, respectively, and computing a chaotic sequence bit successively using the (N) binary values; and generating a preamble based on the chaotic sequence bit. By using the sequence bit from the chaotic samples, a plurality of preambles with optimum auto-correlation and cross-correlation properties is generated.

12 Claims, 10 Drawing Sheets

```
     z_3^1                z_2^1                z_1^1                z_0^1
0001100110011001  0000100010001000  0000001011011000  0000000011110010
0001100110011001  1110111011101110  0100111110100100  0001101010001100
0001100110011001  0000100010001000  1111101001001111  0101001101101111
0001100110011001  1110111011101110  0110000010110110  0010000000111100
0001100110011001  0000100010001000  0000001011011000  1111111000011010
000110011001100̶1̶  1110111011101110  0100111110100100  1100101011100111
0001100110011001  0000100010001000  1111101001001111  0101100100100000
0001100110011001  1110111011101110  0110000010110110  1011111110000110
```
→ Maximum distance !

METHOD AND APPARATUS FOR GENERATING PREAMBLE USING CHAOTIC SEQUENCE

CROSS-REFERENCE TO RELATED APPLICATIONS

This application claims the benefit of U.S. Provisional Patent Application No. 60/479,220 filed Jun. 18, 2003 in the U.S. Patent and Trademark Office, and Korean Patent Application No. 2003-71618 filed Oct. 15, 2003, the disclosures of which are incorporated herein by reference.

BACKGROUND OF THE INVENTION

1. Field of the Invention

The present invention relates to a method and an apparatus for generating a preamble, and more particularly, to a method and an apparatus for generating a preamble which is suitable for an ultra-wideband communication system supporting multi-piconet technology using a chaotic sequence.

2. Description of the Related Art

A preamble signal is used in the timing synchronization of signals transmitted between at least two systems. The preamble indicates that a certain system is about to transmit data, and is defined by a string of certain transmission pulses recognized by the communication systems. Reliable timing ensures correct translation of the beginning of information transmission of all the communication systems, and also ensures that all the receiving systems accurately understand when the data transmission begins. Pulses for a preamble vary depending on the network technologies adopted.

Figure 1:
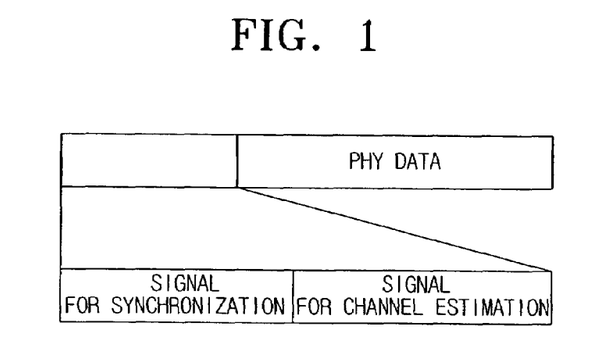
FIG. 1 illustrates the structure of a general preamble.

FIG. 1 shows the structure of a general preamble. As shown, a preamble generally includes a signal for synchronization, a signal for channel estimation and data for a physical sub-layer. In the communication system, the preamble synchronizes frames and estimates signal degradation in the channel used.

Generally, 'ultra high frequency communication system' refers to a system that supports ultra high frequency wireless communications services between a piconet coordinator (PNC) and a device (DEV). For synchronization between the PNC and DEV, a synchronous signal is periodically transmitted to indicate the beginning of the frames. The DEV receives the synchronous signal, synchronizes a frame to the PNC, and estimates signal degradation that may have occurred in the channel to utilize it in the wave detection of the data being received after the frame synchronization. As for the synchronous signal, it is common for a preamble signal agreed upon between the PNC and the DEV to be used.

The DEV receives the preamble signals which are periodically received from the PNC, and determines the frame synchronization in accordance with the strength of the signals being outputted through an internal correlator. The reception performance of the preamble signal depends on the auto-corrrelation property, and a higher auto-correlation property is required.

There are usually a plurality of piconets existing in the ultra-wideband communication system, and interference between neighboring piconets usually causes deterioration in wave detection. Interference with neighboring piconets can also occur in the reception of the preamble signal, which usually degrades the frame synchronization performance. A preamble signal has to be designed with the above-mentioned considered. Further, the preamble signal has to have a good cross-correlation property to support multiple piconets, which means the preamble signal requires a low cross-correlation property.

A similar use of the above-mentioned preamble is found in a UMTS (Universal Mobile Telecommunication System) of wideband CDMA. The UMTS has a plurality of slots in the frame, and a synchronous signal indicating the beginning of the slots. The frame synchronous signal is periodically transmitted between a base station and a terminal according to a predetermined sequence. However, because the UMTS is designed to operate optimally in a cellular communication environment, it is somewhat impractical to employ it in an ultra-wideband communication system. Accordingly, a preamble, which is optimum for use in ultra-wideband communication, is required.

SUMMARY OF THE INVENTION

The present invention has been developed in order to solve the above drawbacks and other problems associated with the conventional arrangement. An aspect of the present invention is to provide an apparatus and a method for generating a preamble suitable for use in an ultra-wideband communication system.

The above object and/or other aspects of the present invention can be substantially achieved by providing a preamble generating method, comprising: (a) computing (N) chaotic samples; (b) transforming (N) chaotic samples into (N) binary values of certain bits, respectively, and computing a chaotic sequence bit successively using the (N) binary values; and (c) generating a preamble based on the chaotic sequence bit.

In the transforming step, the (N) chaotic samples are represented by $X_i$, and are computed by using a chaotic mapping function (F) by periodic orbits, the chaotic mapping function (F) being expressed by, $X_{k+1}=F(X_k)$, where, $X_0$ is an initial value, and k=0, 1, 2, 3, . . . .

The chaotic mapping function (F) uses one of a Bernoulli shift map, a tent map, a twisted tent map, and a ship map.

Additionally, there are provided the steps of: computing an inverse mapping function of the chaotic mapping function (F), using the inverse mapping function with respect to (M) different chaotic samples by periodic orbits, and computing a plurality of initial values for the (M) chaotic samples, respectively; among the plurality of initial values computed for the (M) chaotic samples, selecting initial values which are at a maximum distance from each other; and generating (M) preambles with respect to the (M) selected initial values, by performing the steps (a) through (c), respectively. The preamble is used in an ultra-wideband communication system which supports multi-piconets, and the number of the multi-piconets is M.

The certain bits are 16 bits, and the number (N) comprises one of 4 and 8.

According to one aspect of the present invention, a preamble generating apparatus comprises a chaotic sample computing part to compute (N) chaotic samples; a chaotic sequence computing part to transform the (N) chaotic samples into (N) binary values of certain bits, respectively, and compute a chaotic sequence bit by successively using the (N) binary values; and a preamble generating part to generate a preamble based on the chaotic sequence bit.

The chaotic sample computing part comprises: a chaotic mapping function part to substitute an input value in a chaotic mapping function and output the result of operation; and a delay part to delay the output result of chaotic mapping function by a predetermined time, and provide the delayed values as the input value to the chaotic mapping function part.

The chaotic mapping function comprises one or more of a Bernoulli shift map, a tent map, a twisted tent map, and a ship map.

The certain bits are 16 bits. The number (N) comprises one of 4 and 8. The preamble is used in synchronization and channel estimation in an ultra-wideband communication system.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Certain embodiments of the present invention will be described in greater detail with reference to the accompanying drawings.

In the following description, identical drawing reference numerals are used for the same elements even in different drawings. The matters defined in the description such as a detailed construction and elements are provided to assist in a comprehensive understanding of the invention. The present invention can be carried out without those defined matters. Also, well-known functions or constructions are not described in detail since they would obscure the invention in unnecessary detail.

Figure 2:
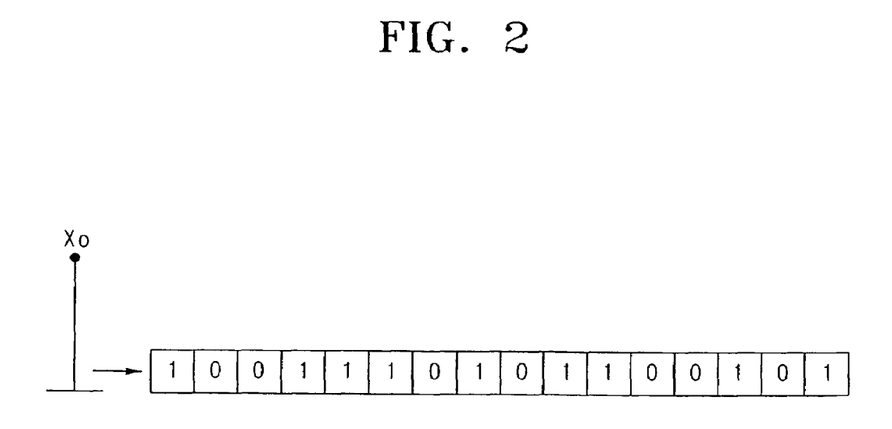
FIG. 2 illustrates one chaotic sample converted into a 16-bit length chaotic sequence bit.

FIG. 2 shows one chaotic sample transformed into a 16-bit length chaotic sequence bit. Referring to FIG. 2, a chaotic sample $X_0$ of certain value is transformed by proper quantization into a 16-bit length binary value which is represented by fixed decimal. In order to generate a chaotic sequence bit of 64-bit or 128-bit length, 4 or 8 successive chaotic samples are generated and transformed into a 16-bit length binary value and used.

Figure 3:
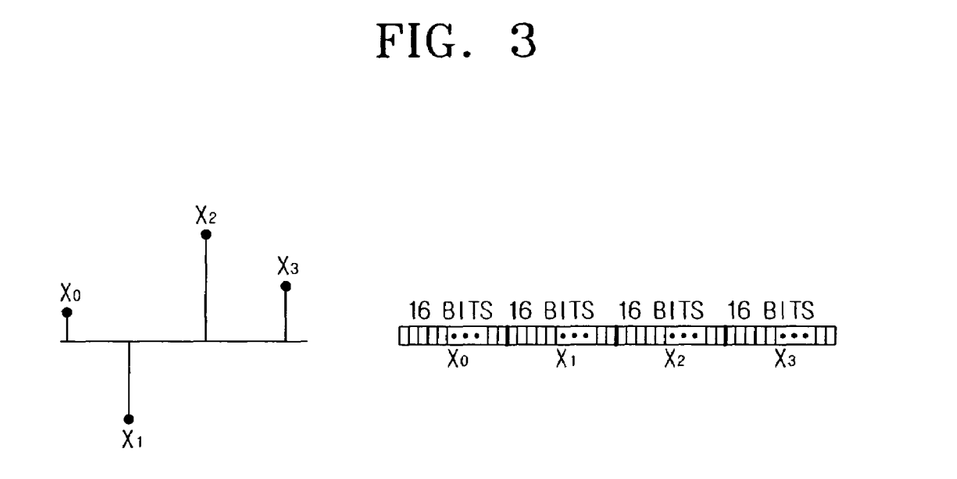
FIG. 3 illustrates a 64-bit length chaotic sequence bit generated by using 4 chaotic samples.

FIG. 3 illustrates the generation of a 64-bit length chaotic sequence bit by using 4 successive chaotic samples. Referring to FIG. 3, 4 chaotic samples $X_0$, $X_1$, $X_2$, $X_3$ are each transformed into a 16-bit binary value, and successively used for generating up to 64 bits of chaotic sequence bits. The chaotic sequence bits are used in the preamble.

Meanwhile, when the initial value $X_0$ is determined, 4 chaotic samples can be generated using a proper chaotic mapping function. That is, by substituting the initial value $X_0$ in a chaotic mapping function F, it is possible to obtain the next chaotic sample $X_1$, and by substituting the next chaotic sample $X_1$ in the chaotic mapping function F, it is possible to obtain the chaotic sample $X_2$ next to the next chaotic sample $X_1$. By several iterations, a desired number of chaotic samples are attained, and this can be expressed by the following function:

$$X_{k+1} = F(X_k) \quad \text{[Function 1]}$$

where, k=0, 1, 2, 3, . . .

By using chaotic samples $X_0$, $X_1$, $X_2$, $X_3$, a 64-bit length chaotic sequence as shown in FIG. 3 can be attained. In order to obtain a 128-bit length chaotic sequence bit, 8 chaotic samples are used.

Figure 4:
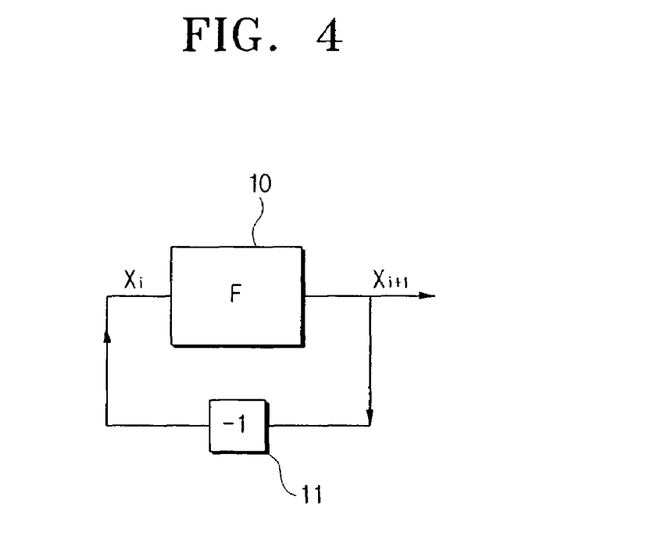
FIG. 4 is a block diagram of one example of an apparatus which successively generates chaotic samples.

FIG. 4 is a block diagram illustrating one example of an apparatus which can successively generate chaotic samples. The apparatus as shown in FIG. 4 comprises a chaotic mapping part 10 and a delay part 11. The chaotic mapping part 10 substitutes input $X_i$ in a predetermined chaotic mapping function, to output a chaotic sample $X_{i+1}$. The delay part 11 delays the output value $X_{i+1}$ for a predetermined time and feeds back the same to the input of chaotic mapping part 10. By iterating this process a predetermined number of times, a desired number of chaotic samples are generated. The chaotic samples as generated are converted into chaotic sequence bits and used for the preamble. A variety of mathematical functions can be used as a chaotic mapping function in the chaotic mapping part 10, and simplicity and easy achievability of the algorithm are considered when selecting a chaotic mapping function.

Figure 5:
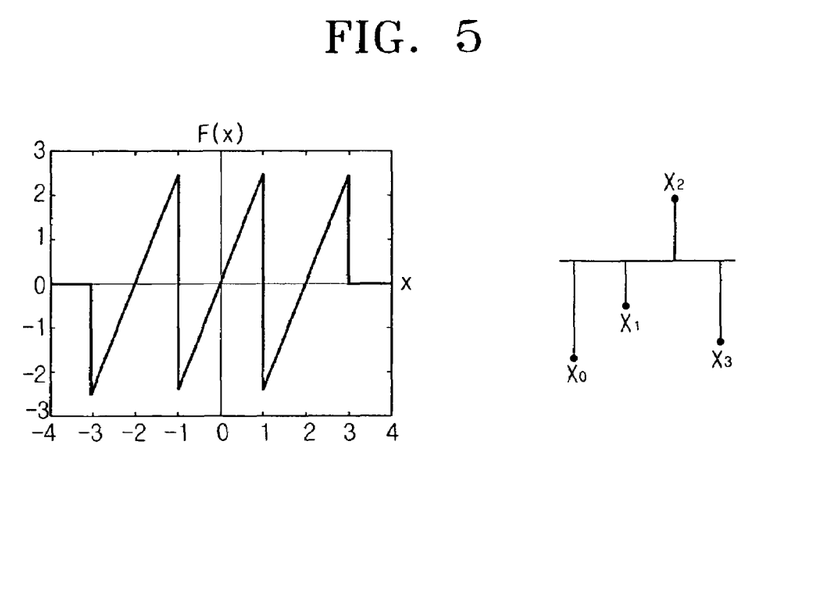
FIG. 5 illustrates one example of a chaotic mapping function, and attaining 4 chaotic samples using the same.

FIG. 5 shows one example of a chaotic mapping function and the process of attaining 4 chaotic samples by using the chaotic mapping function. Referring to FIG. 5, an initial value $X_0$ is substituted in the mapping function F(x) so that a value $X_1$ is derived, and by substituting the value $X_1$ in the mapping function F(x), a next value $X_2$ is obtained. By the above iteration, the following values, $X_3$ and $X_4$, are obtained. For example, if $X_0=-0.9922$, values $X_1$, $X_2$, $X_3$ and corresponding binary values are:

$X_0=-0.9922$, 101001101100010
$X_1=-0.4904$, 100100110010100
$X2=0.7690$, 000111100001010
$X_3=-0.9800$, 101001100100100

Figure 6A:
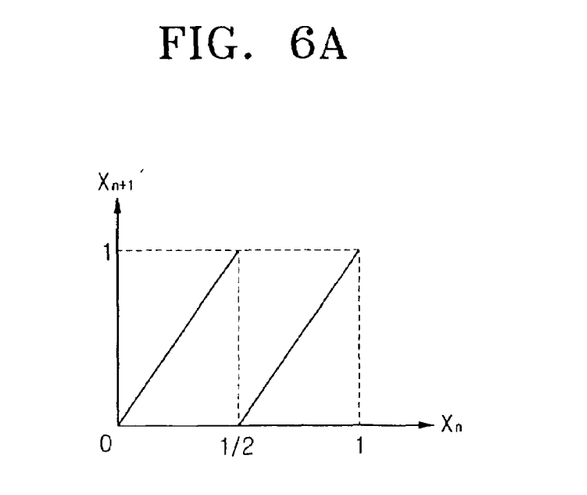
FIGS. 6A to 6D illustrate one example of an easily-achievable chaotic mapping function.
Figure 6B:
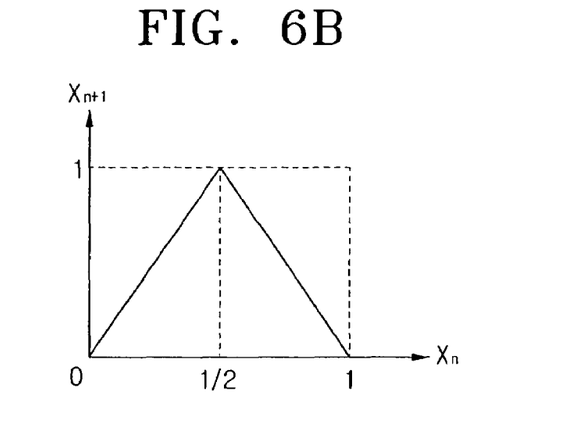
Figure 6C:
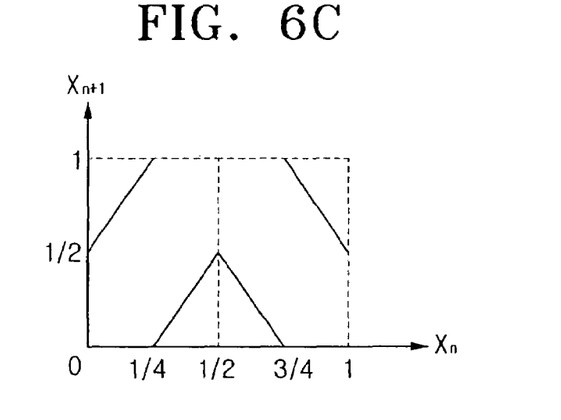
Figure 6D:
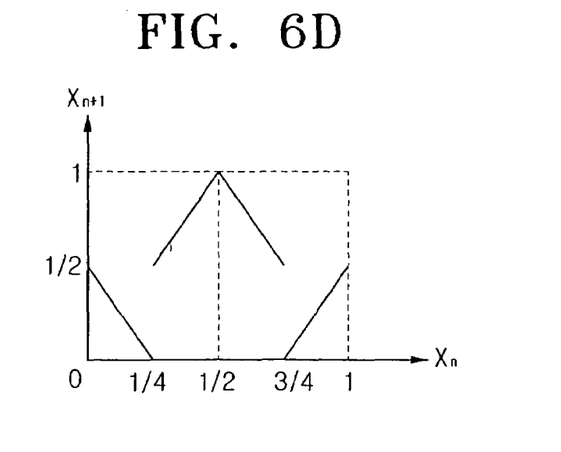

FIGS. 6A through 6D show an example of a chaotic mapping function which is simple to achieve. FIG. 6A shows a Bernoulli shift map, FIG. 6B a tent map, FIG. 6C a twisted tent map, and FIG. 6D is a ship map. As shown, a variety of maps can be used as a chaotic mapping function, according to which chaotic samples are obtained and chaotic sequence bits are obtained from the generated chaotic samples.

Figure 7A:
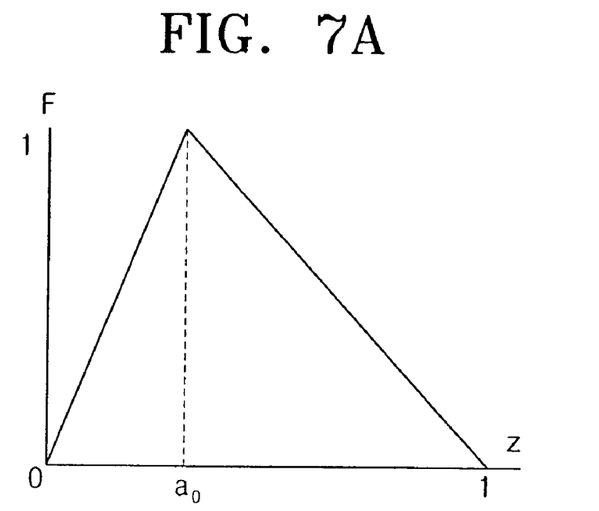
FIGS. 7A and 7B illustrate an asymmetric tent chaotic mapping function and an inverse mapping function.
Figure 7B:
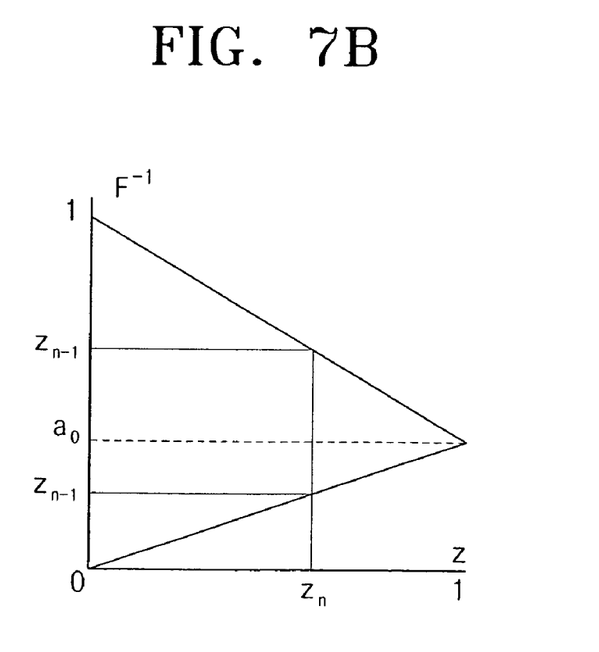

FIG. 7A shows an asymmetric tent chaotic mapping function, and FIG. 7B shows an inverse mapping function of the asymmetric chaotic mapping function of FIG. 7A. As shown in FIGS. 7A and 7B, an initial value can be determined by using the inverse mapping function of the chaotic mapping function. More specifically, an initial value $Z_0$ can be determined by iterating an inverse mapping function $F^{-1}$ of the chaotic mapping function.

$$Z_2 = F^{-1}(Z_3)$$

$$Z_1 = F^{-1}(Z_2)$$

$$Z_0 = F_{-1}(Z_1) \quad \text{[Functions 2]}$$

Figure 8:
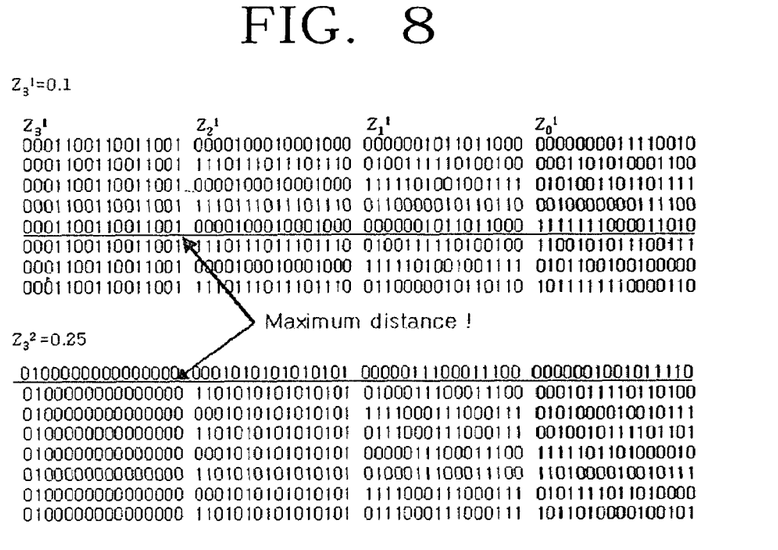
FIG. 8 illustrates an initial value determination method for multiple piconets.

The above method can be used in determining an initial value of the piconet-supporting chaotic sequence bits. The last samples $Z_3^1=0.1$, $Z_3^2=0.25$ of the first piconet and the second piconet are substituted in the above functions 2 by periodic orbits, and the values as shown in FIG. 8 are obtained.

A value can be selected as an initial value among the chaotic sequence bits to obtain maximum distance as possible. In the same way, an initial value for 4 or more picoents can be obtained, and by using the selected initial value, a low cross-correlation property can be obtained.

Figure 9:
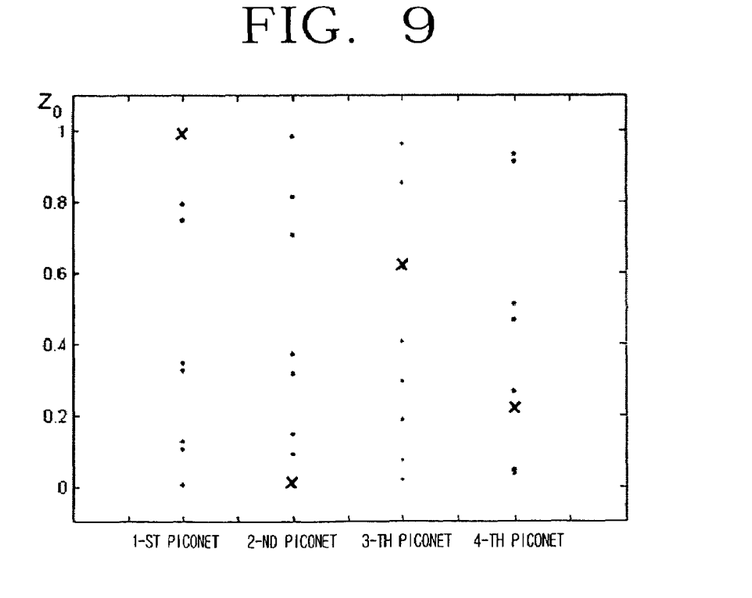
FIG. 9 illustrates a variety of initial values for 4 piconets.

FIG. 9 illustrates a variety of initial values for 4 piconets. As shown, by properly selecting initial values for the 4 piconets, a good preamble, that is, the preamble contributing to an improved cross-correlation property can be generated for use in the multi-piconet supporting communication system.

Figure 10:
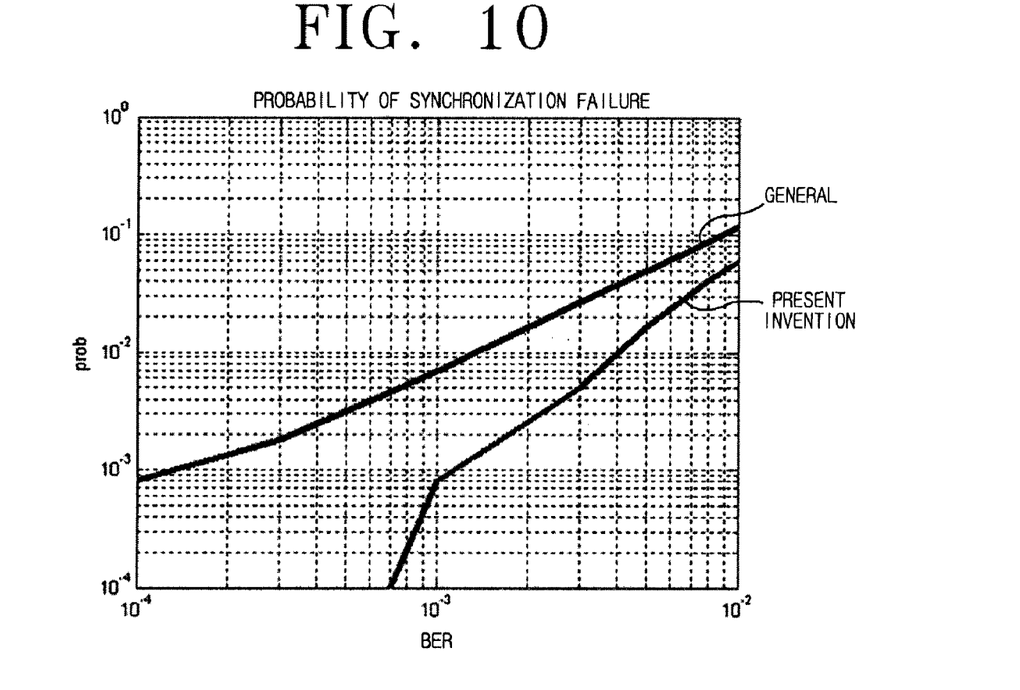
FIG. 10 simulates the synchronization performance of the preamble which is generated by the preamble generating method using a chaotic sequence according to an embodiment of the present invention.

FIG. 10 simulates the synchronization performance with the preamble generated in accordance with the preamble generating method using a chaotic sequence according to one embodiment of the present invention. In the simulation, a preamble generated by 4 chaotic samples was used, and synchronization was attempted up to 1000 times. FIG. 10 shows the probability of synchronization failure vs. bit error rate (BER). More specifically, FIG. 10 shows the probability of the synchronization failure when the receptivity of the first bit of the preamble sequence was poorest, that is, the case when the probability of synchronization of the first bit was assumed to be ½.

Figure 11:
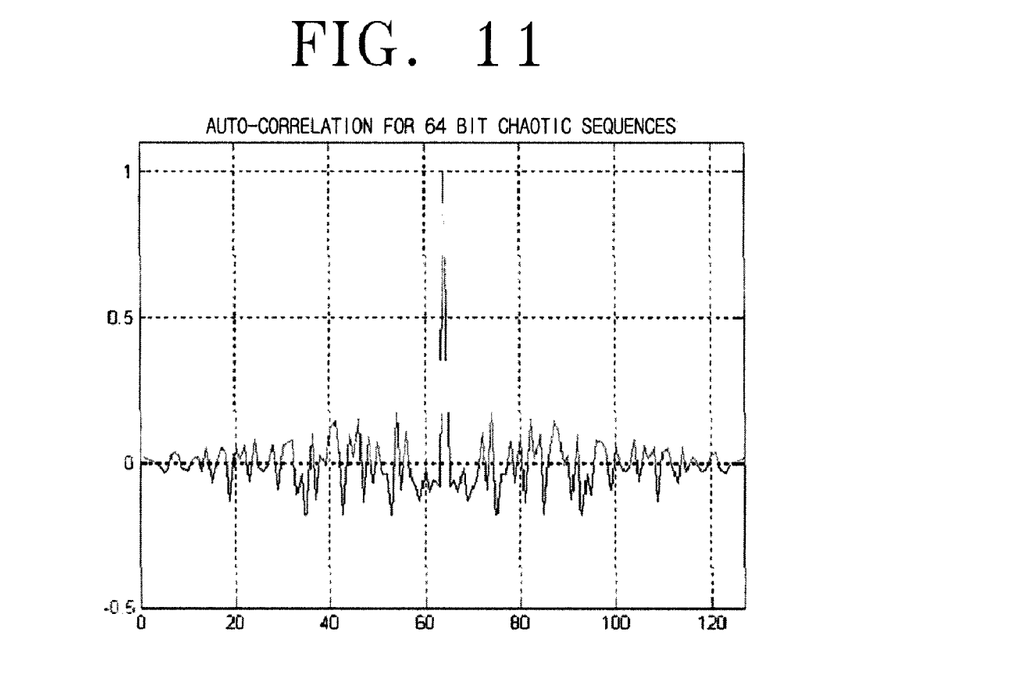
FIG. 11 illustrates an auto-correlation property of the 64-bit length chaotic sequence which is generated by the preamble generating method using a chaotic sequence according to an embodiment of the present invention.
Figure 12:
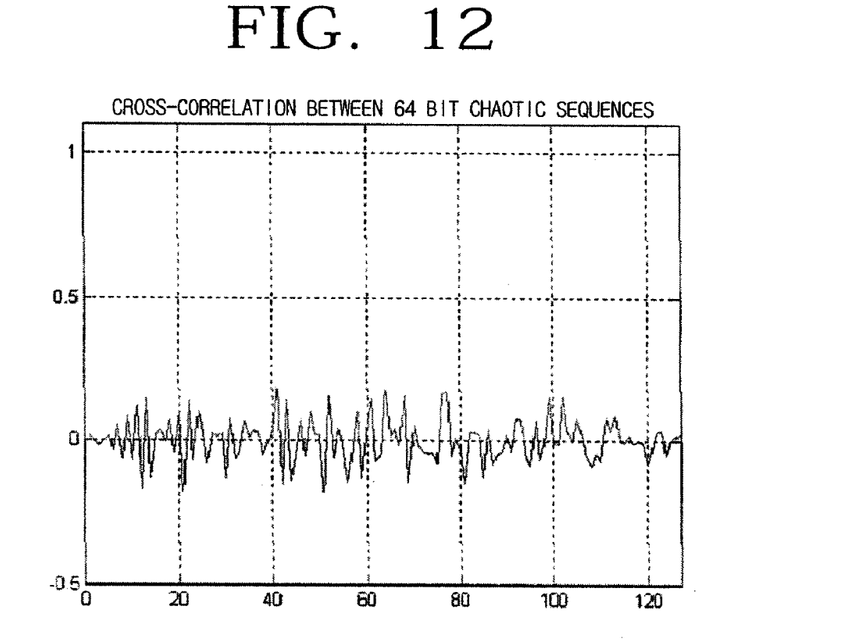
FIG. 12 illustrates a cross-correlation property of the 64-bit length chaotic sequence which is generated by the preamble generating method using a chaotic sequence according to an embodiment of the present invention.
Figure 13:
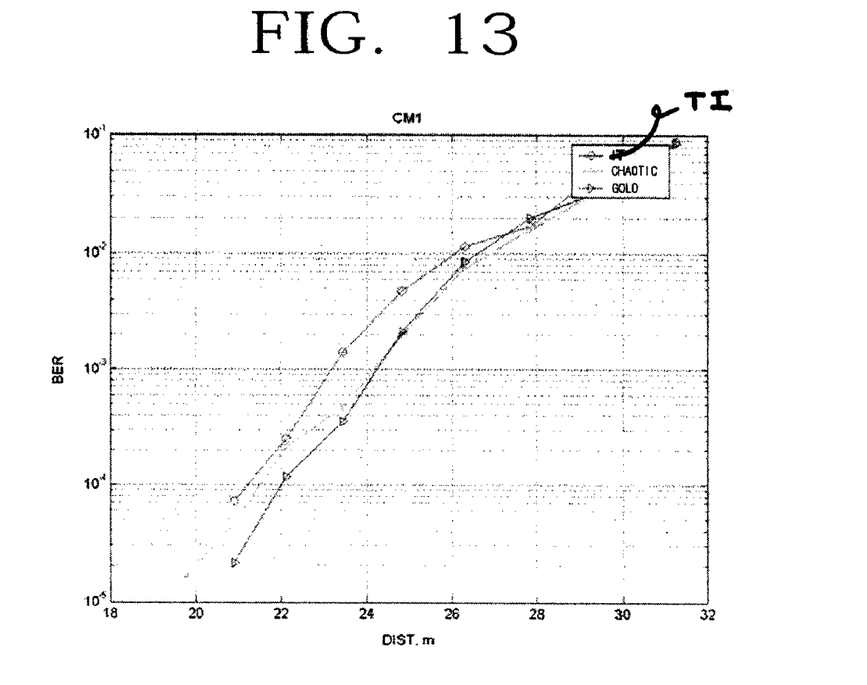
FIG. 13 illustrates the distance (DIST) of the preamble which is generated by the preamble generating method using a chaotic sequence according to an embodiment of the present invention versus bit error rate (BER) in the CM1 channel for performance comparison with other sequences.
Figure 14:
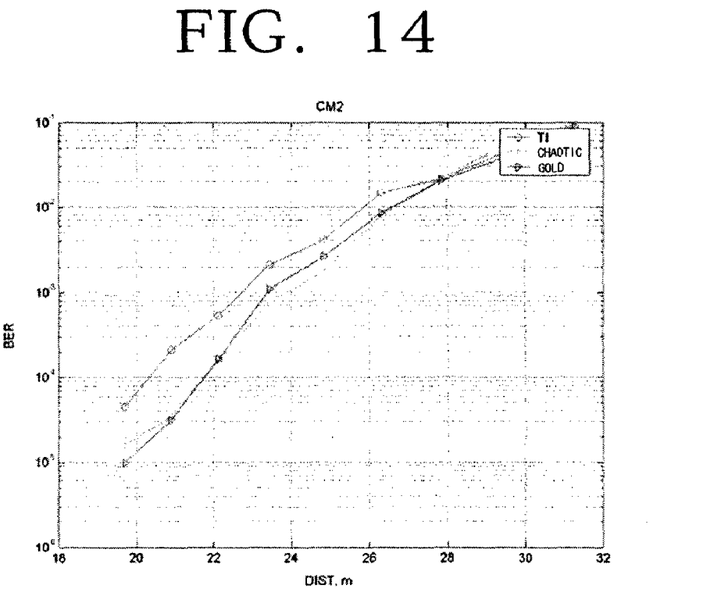
FIG. 14 illustrates the distance (DIST) of the preamble which is generated by the preamble generating method using a chaotic sequence according to an embodiment of the present invention versus bit error rate (BER) in the CM2 channel for performance comparison with other sequences.
Figure 15:
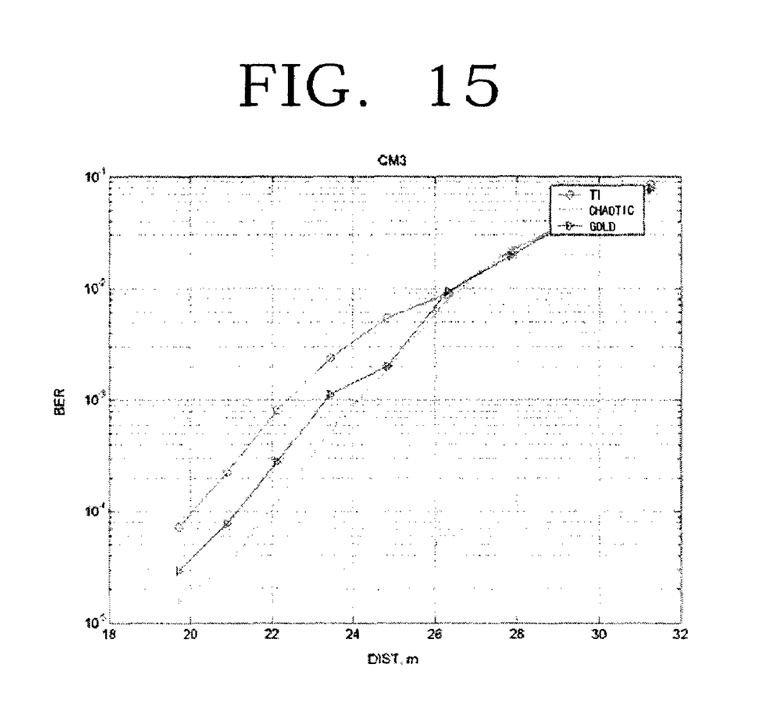
FIG. 15 illustrates the distance (DIST) of the preamble which is generated by the preamble generating method using a chaotic sequence according to an embodiment of the present invention versus bit error rate (BER) in the CM3 channel for performance comparison with other sequences.
Figure 16:
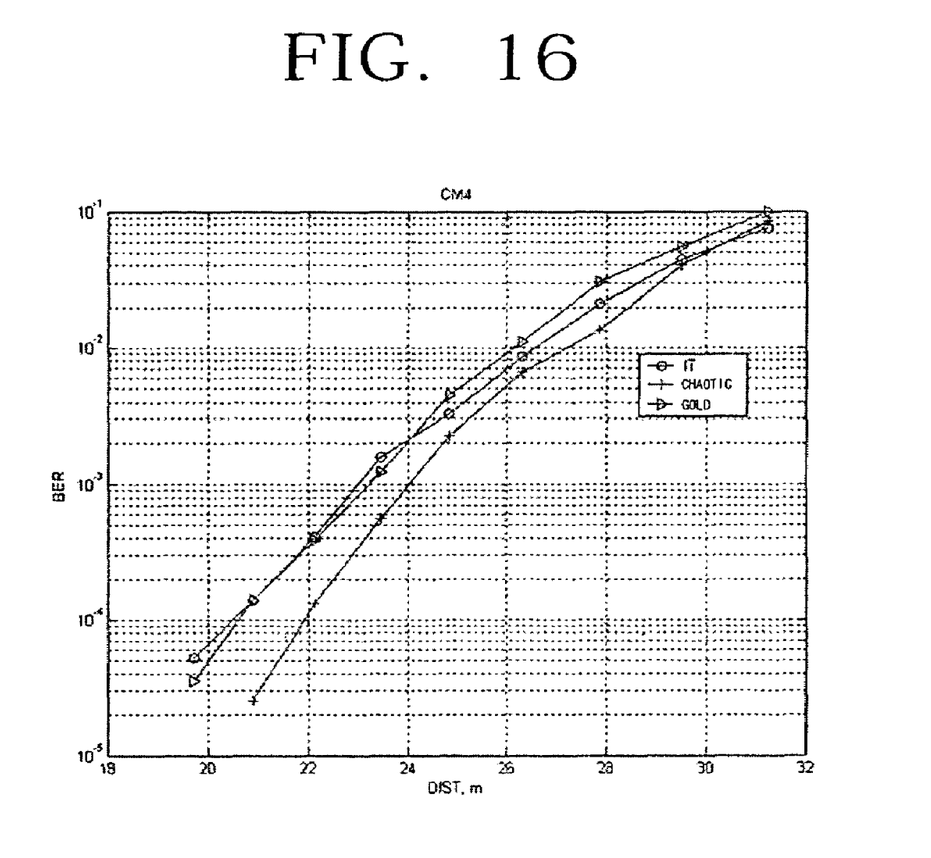
FIG. 16 illustrates the distance (DIST) of the preamble which is generated by the preamble generating method using a chaotic sequence according to an embodiment of the present invention versus bit error rate (BER) in the CM4 channel for performance comparison with other sequences.

FIGS. 11 and 12 illustrate auto-correlation and cross-correlation properties of a chaotic sequence which is generated by a preamble generating method using a chaotic sequence according to one embodiment of the present invention. As shown, the chaotic sequence generated in accordance with the present invention has a high auto-correlation coefficient and low cross-correlation coefficient.

FIGS. 13 through 16 illustrate distance vs. BER of a preamble by one embodiment of the present invention, respectively showing performance compared with other sequences in the channels of CM1, CM2, CM3 and CM4. In the example as shown in FIGS. 13 through 16, the sequence by the present invention was compared with a Gold sequence and a sequence proposed by TEXAS INSTRUMENTS (TI) (IEEE P802.15-3/142r0). As shown, the chaotic sequence according to the present invention provides superior performance to the other sequences as the channels degrade, such as in the channels of CM3 and CM4.

The following table lists results of a comparison between the chaotic sequence (CSS) by the preamble generating method according to one embodiment of the present invention, and the constant amplitude zero auto-correlation (CAZAC) sequence.

TABLE 1

| Processing technique | CSS Subsequent processing of the input samples | CZACA Correlation technique |
|---|---|---|
| Length (bit) | 64 (potential lt < 40) | 128 |
| Piconet identification | Yes | No |
| Number of available piconets | Plural | 1 (for BPSK under UWB) |
| Implementation | Respectively simple | |
| Channel characteristics | High SNR | SNR ~−10 dB |
| Stability | Yes a) by choice unique map b) by choice of unique map parameters | No |
| External time synchronization | No | Yes |

As shown in the Table 1, it is simpler to generate preambles by using a chaotic sequence, and is also more feasible to generate preambles suitable for an ultra-wideband communication system which supports multi-piconets by using chaotic sequence.

As described above in a few exemplary embodiments of the present invention, a preamble of optimum auto-correlation and cross-correlation properties can be generated by using a sequence bit with a chaotic sample. By using the preamble generated according to the present invention, good data reception is guaranteed even under changes in channel environment and piconet environment.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A preamble generating method, comprising:
   computing (N) chaotic samples by putting an initial value into a chaotic mapping function;
   transforming the (N) chaotic samples into (N) binary values of certain bits, respectively, and computing a chaotic sequence bit successively using the (N) binary values; and
   generating a preamble based on the chaotic sequence bit;
   computing an inverse mapping function of the chaotic mapping function (F), using the inverse mapping function with respect to (M) different chaotic samples by periodic orbits, and computing a plurality of initial values for the (M) chaotic samples, respectively;
   among the plurality of initial values computed for the (M) chaotic samples, selecting initial values which are at a maximum distance from each other; and generating (M) preambles with respect to the (M) selected values.

2. The preamble generating method of claim 1, wherein the (N) chaotic samples are represented by Xi, and are computed by using the chaotic mapping function (F) by periodic orbits, the chaotic mapping function (F) being expressed by, where, X0 is an initial value, and k=0, 1, 2, 3, . . .

3. The preamble generating method of claim 2, wherein the chaotic mapping function (F) uses one of a Bernoulli shift map, a tent map, a twisted tent map, and a ship map.

4. The preamble generating method of claim 1, wherein the preamble is used in an ultra-wideband communication system which supports multi-piconets, and the number of the multi-piconets is M.

5. The preamble generating method of claim 1, wherein the certain bits comprise 16 bits.

6. The preamble generating method of claim 1, wherein the number (N) comprises one of 4 and 8.

7. A preamble generating apparatus, comprising:
- a chaotic sample computing part operable to compute (N) chaotic samples by putting an initial value into a chaotic mapping function;
- a chaotic sequence computing part operable to transform the (N) chaotic samples into (N) binary values of certain bits, respectively, and compute a chaotic sequence bit by successively using (N) binary values; and
- a preamble generating part operable to generate a preamble based on the chaotic sequence bit,
- wherein an inverse mapping function of the chaotic mapping function is computed using the inverse mapping function with respect to (M) different chaotic samples by periodic orbits, and a plurality of initial values for the (M) chaotic samples are computed;
- wherein, among the plurality of initial values computed for the (M) chaotic samples, initial values which are at a maximum distance from each other are selected; and
- wherein (M) preambles with respect to the (M) selected values are generated.

8. The preamble generating apparatus of claim 7, wherein the chaotic sample computing part comprises:
- a chaotic mapping function part operable to substitute an input value in the chaotic mapping function and output the result; and
- a delay part operable to delay the output result of the chaotic mapping function by a predetermined time, and provide the delayed values as the input value to the chaotic mapping function part.

9. The preamble generating apparatus of claim 8, wherein the chaotic mapping function comprises one of at least a Bernoulli shift map, a tent map, a twisted tent map, and a ship map.

10. The preamble generating apparatus of claim 7, wherein the certain bits comprise 16 bits.

11. The preamble generating apparatus of claim 7, wherein the number (N) comprises one of 4 and 8.

12. The preamble generating apparatus of claim 7, wherein the preamble is used in synchronization and channel estimation in an ultra-wideband communication system.

* * * * *